United States Patent [19]
Kraus

[11] Patent Number: 5,722,508
[45] Date of Patent: Mar. 3, 1998

[54] OIL CHANGE DEVICE

[76] Inventor: Terrance Donald Kraus, 4147 Alcazar St., NE., Albuquerque, N. Mex. 87109

[21] Appl. No.: 669,027

[22] Filed: Jun. 24, 1996

[51] Int. Cl.⁶ ............................................. F16C 3/14
[52] U.S. Cl. ................................. 184/1.5; 141/98
[58] Field of Search ....................... 184/1.5; 141/98; 123/196 R

[56] References Cited

U.S. PATENT DOCUMENTS

| | | | |
|---|---|---|---|
| 3,874,478 | 4/1975 | Mantell, Jr. | 184/1.5 |
| 4,756,349 | 7/1988 | Atkins | 184/1.5 |
| 4,776,431 | 10/1988 | Poling | 184/1.5 |
| 5,121,776 | 6/1992 | Kovach | 141/98 |
| 5,320,145 | 6/1994 | Avino | 141/98 |

*Primary Examiner*—Thomas E. Denion
*Attorney, Agent, or Firm*—Jeffrey D. Myers; D. Goelet Kehl; Deborah A. Peacock

[57] ABSTRACT

An oil change device to facilitate the collection of the spent motor oil from an internal combustion engine's ferromagnetic crankcase and ferromagnetic oil filter, having a flexible tube connecting a sealing cover unit to an oil collection container. Permanent magnets, imbedded in the sealing cover unit provide a means to attach the sealing cover unit to the crankcase and oil filter. The distal end of a wrench shaft protrudes through an orifice in the base member and extends to the superior surface of the baffle member. A wrench socket that fits the crankcase drain plug head is connected to the distal end of the wrench shaft and a socket wrench, attached to the proximal end of the wrench shaft, is used to unscrew and remove the crankcase drain plug. An oil filter piercing tool is connected to the distal end of the wrench shaft and used to pierce the skin of the oil filter when a striking blow is delivered to the proximal end of the wrench shaft. The spent oil from the crankcase and oil filter flows by gravity into the sealing cover unit, through the flexible tube, and into the oil collection container.

19 Claims, 1 Drawing Sheet

OIL CHANGE DEVICE

BACKGROUND OF INVENTION

This invention relates in general to automobile maintenance and in particular to a simple device that facilitates the collection the spent oil from an internal combustion engine's crankcase and oil filter.

Many do-it-yourselfers have found that changing an internal combustion engine's oil can be a dirty and frustrating task. The most troublesome task associated to changing the oil is collecting the spent oil from the crankcase and oil filter. The present invention provides an improved method to collect the spent oil in an essentially spill-free manner. Some of the benefits of the present invention are that it is noncomplex, lightweight, easy to operate, of inexpensive construction, and requires no modifications to the machine's (e.g., automobile) engine compartment.

Conventional methods used to collect the spent oil involve placing a container under the crankcase drain plug, removing the drain plug using a wrench, and allowing the oil to flow by gravity into the container. Similarly, the oil from an oil filter is conventionally collected by placing a container under the oil filter mounting boss on the engine, unscrewing the oil filter, and allowing the oil to flow by gravity into the container. Conventional methods do not provide an adequate method to collect the spent oil because they frequently result in oil spills which create environmental and health hazards, and reduce the amount oil, a nonrenewable resource, that is recycled. Oil is often spilled onto the ground, driveways, and garage floors, etc., when the oil collecting pan is not properly aligned under the crankcase drain hole and oil filter. Oil is also frequently spilled onto the machine's components when the crankcase drain plug and oil filter are removed. Many contemporary automobiles and trucks are equipped with internal combustion engines that have the crankcase drain hole located on the side of the crankcase. This location increases the chances of spilling oil because the mechanic must anticipate and account for the forward (horizontal) momentum of the falling oil when aligning the collecting container under the crankcase drain hole. Gusts of wind can also create spills by blowing the falling oil over the edge of the collection container.

Another deficiency of conventional methods is that the mechanic must be in direct, hand contact with the crankcase drain plug and oil filter as they are removed. This frequently results in the mechanic's hands being splashed with oil as the oil gushes out from the oil pan and from the interface between the oil filter and the oil filter mounting boss on the engine. This problem is amplified by the fact that the oil is usually removed after the engine has been run long enough to reach operating temperature. The mechanic can receive thermal burns if he or she comes into direct contact with the hot oil, oil filter, and engine components. Still another deficiency of the conventional methods is that the crankcase drain plug can slip and fall directly into the collecting container as it is removed, requiring the drain bolt to be fished out of the spent oil. The final deficiency of the conventional methods described herein is that the collected oil must be transferred from the collecting container to another container to be taken to a recycling center, thereby creating additional opportunities for spills and direct contact exposures to occur.

Various devices and methods have been proposed to solve the problems of conventional oil changing methods. Some of these devices and methods are intended for use by do-it-yourselfers and some are intended for use by personnel managing large scale operations (e.g., a fleet of delivery vehicles).

In U.S. Pat. No. 1,668,245 the inventor discloses a device that is intended to be used to remove the crankcase drain plug and to direct the oil into an oil collection container. The device includes a rotatable drain funnel equipped with means to engage and remove the drain plug, and a means to direct the oil in to a container. U.S. Pat. No. 1,668,245 does not provide a suitable means to change the oil because its large size requires the vehicle to be placed on a lift or to be positioned over a pit, the device must be held in place by hand while the oil is being collected, and the device does not offer a solution to remove the residual oil in the oil filter.

In U.S. Pat. No. 1,686,749 the inventor discloses a device to remove the crankcase drain plug and to collect the spent oil. The device includes a geared crankcase drain plug remover mounted on a receiving container. U.S. Pat. No. 1,686,749 does not provide a suitable means to change the oil because it is difficult to position and use, the device does not ensure the spent oil is contained at all times, and the device does not offer a solution to collect the residual oil in the oil filter.

In U.S. Pat. No. 2,746,330 the inventor discloses an oil filter remover tool that includes a cup-shaped container equipped with a shaft extending through and soldered to the bottom of the cup. A socket type device is mounted to the end of the shaft inside of the cup and a handle is mounted on the opposite end of the shaft that extends outside of the cup. The oil filter is removed by placing the cup over the oil filter so the socket type device engages the head of a bolt mounted on the oil filter and unscrewing the oil filter by rotating the handle on the shaft. U.S. Pat. No. 2,746,330 does not provide a suitable means to change the oil because it does not provide a means to collect the oil from the oil filter before it is removed and the device offers no solution to collect the oil from the crankcase.

In U.S. Pat. No. 3,967,697 the inventor discloses a device that is intended to be used to collect the oil from the crankcase. The device includes a special drain plug that replaces the stock crankcase drain plug and allows the oil to be drained from the crankcase without completely removing the drain plug. The neck of the special drain plug has a funnel shaped extension that is intended to direct the oil into a collection container. U.S. Pat. No. 3,967,697 does not provide a suitable means to change the oil because it requires a special drain plug to be installed in the crankcase, the device does not ensure the spent oil is contained at all times, and the device offers no solution to collect the residual oil from the oil filter.

In U.S. Pat. No. 4,230,002 the inventor discloses a device that is intended to be used to remove the crankcase drain plug and to direct the oil to a collecting container. The device includes funnel shaped device equipped with means to engage and remove the drain plug, and a drain hose. U.S. Pat. No. 4,230,002 does not provide a suitable means to change the oil because it must be held in place by hand while the oil is drained and the device offers no solution to collect the residual oil from the oil filter.

In U.S. Pat. No. 4,485,853 the inventor discloses a device that is intended to be used to remove a previously loosened crankcase drain plug without making direct, hand contact with the drain plug and to catch the oil in collection container. The device includes a rigid plastic cylinder, a means to securely hold the device with one hand, and a plastic sheet attached to one end of the cylinder that serves as the bottom of the container and protects the hand from the oil as the drain plug is removed. U.S. Pat. No. 4,485,853 does not provide a suitable means to change the oil because it is difficult to use and the device offers no solution to collect the residual oil from the oil filter. In addition the device does not offer an acceptable method to remove the drain plug because it is difficult to firmly grip an oily drain plug with the plastic sheet between the mechanics hand and the drain plug.

In U.S. Pat. No. 4,592,448 the inventor discloses a device that is intended to be used to remove the crankcase drain plug without making direct, hand contact with the drain plug and to collect the oil in a collection bag. The device includes an elbow shaped conduit, a rotatable drain plug removing wrench fixed in a sleeve member that extends through the outer conduit wall, a flexible collection bag, a means to attach the flexible bag to the conduit, and Velcro (R) type eye-and-hook fasteners to attach the conduit to the crankcase. U.S. Pat. No. 4,592,448 does not provide a suitable means to change the oil because the collection bag must be held in place while the oil is collected, the device does not offer a solution to collect the residual oil from the oil filter, and it is difficult to secure the device to the crankcase using Velcro (R) type eye-and-hook fasteners under oily and dirty conditions.

In U.S. Pat. No. 4,865,156 the inventor discloses a device that is intended to be used collect the oil from the oil filter and crankcase and to direct the oil into a collection container. The device includes a suction cup device equipped with a means device to pierce the outer wall of an oil filter, a suction cup device equipped with a means to remove the drain plug without making direct, hand contact with the drain plug, flexible tubing that connects each of the suction cup devices to a collection container, and a vacuum motor to suction the oil from the oil filter and crankcase. U.S. Pat. No. 4,865,156 does not provide a suitable means to change the oil because it is overly complex and of expensive construction.

In U.S. Pat. No. 5,044,334 the inventor discloses a device that is intended to be used to collect the spent oil from the oil filter and crankcase, to introduce a suitable amount of fresh oil into the engine, and to flush the internal components of the engine with a flushing fluid. U.S. Pat. No. 5,044,334 includes an oil filter adapter that is mounted to the oil filter mounting boss on the engine, a remote oil filter mounting boss mounted in the engine compartment, suitable inlet and outlet hoses, an external pump, and a source of purge gas (e.g., compressed air). U.S. Pat. No. 5,044,334 also includes a drain-opening adapter that replaces the crankcase drain plug. U.S. Pat. No. 4,951,784 and U.S. Pat. No. 5,044,334 does not provide a suitable means to change the oil because it is overly complex, of expensive construction, and requires numerous modifications and additions to be made to the vehicle.

In U.S. Pat. No. 5,074,379 the inventor discloses a device that is intended to be used collect the oil from the oil filter and crankcase. The device includes an electric pump, a key-operated electromechanical drain valve, a flange and bracket assembly to relocate the oil filter within the engine compartment, suitable flexible tubing to connect the drain pan and oil filter to the pump and to connect the pump to the drain valve, a means to electrically connect the pump to the vehicle's battery, and an on/off switch to control the pump. U.S. Pat. No. 5,074,379 does not provide a suitable means to change the oil because it is overly complex, of expensive construction, and requires numerous modifications and additions to be made to the vehicle.

In U.S. Pat. No. 5,327,862 the inventor discloses a device that is intended to be used collect the oil from the oil filter and crankcase and to introduce a suitable amount of fresh oil into the engine, and to flush the internal components of the engine with a flushing fluid. The device include an oil filter adapter that is mounted to the oil filter mounting boss on the engine, an adapter that replaces the drain plug and facilitates oil draining, suitable inlet and outlet hoses, an external pump, and a source of purge gas. U.S. Pat. No. 5,327,862 does not provide a suitable means to change the oil because it is overly complex, expensive, and requires numerous modifications and additions to be made to the vehicle.

In U.S. Pat. No. 5,454,960 the inventor discloses a device that is intended to be used collect the oil from the oil filter and crankcase and to introduce a suitable amount of fresh oil into the engine. The device includes a drain check valve/ adapter that replaces the crankcase drain plug, an oil collection bag that is fitted over the oil filter, an oil collection container, and sufficient tubing to connect the oil collection bag to the oil collection container and to connect the drain check valve/adapter to the oil collection container. U.S. Pat. No. 5,454,960 does not provide a suitable means to change the oil because it is requires a special drain check valve/ adapter and it is difficult to properly position the oil collection bag over the oil filter on many engine designs, especially when the engine is hot.

A device is also know that suctions the oil out through the oil level indicator (i.e., dipstick) receiving tube. The device does not provide a suitable means to change the oil because it does not adequately remove the spent oil, sediments, and residues from the crankcase and a vacuum pump is required.

Whatever the precise merits, features and advantages of the above cited oil change devices, they do not achieve or fulfill the purposes of the present invention. There is no suitable alternative to the present invention which provides a superior system for collecting a vehicle's oil and oil filter.

SUMMARY OF INVENTION

The principle object of the present invention is to provide a device that the home mechanic can use to facilitate the collection of spent oil from an internal combustion engine's crankcase and oil filter, without creating an oily mess.

It is also an objective of the present invention to provide a means to remove the drain plug that does not require the mechanic to make direct, hand contact with the drain plug as it is removed from the crankcase.

A further objective of the present invention is to minimize the volume of oil that is inadvertently spilled as the spent oil is collected. This will decrease the environmental and health hazards created by spilled oil and will increase the volume of spent oil that is available for recycling.

The final objective is to provide a device that is noncomplex, lightweight, easy to operate, and of inexpensive construction. The foregoing objectives, as well as other objectives which will become apparent from the discussion that follows, are achieved using the present invention.

A primary feature of the present invention is a sealing cover unit. A flexible, expandable baffle represents the top member of the sealing cover unit. The baffle serves as the mouth of the sealing cover unit. The superior surface of the baffle member is flat and flexible. Permanent magnets are imbedded around the circumference of the superior surface of the baffle member. A plastic, cup-like, base member represents the rectangular bottom of the sealing cover unit and serves as a fluid reservoir. The base member includes first and second orifices in its inferior surface. A tube fixture member is mounted on the inferior surface of the base member and communicates with the first orifice in the base member. The distal end of wrench shaft member protrudes through the second orifice in the base member and extends to the superior surface of the baffle member. The distal end of the wrench shaft member is a square, male-type head that provides a means to connect the wrench shaft member to a typical wrench socket having a complimentary, square, female-type head. The proximal end of the wrench shaft member is a square, female-type head that provides a means to connect the wrench shaft member to a typical socket wrench member having a complimentary, square, male-type head. A rubber grommet member forms a leaktight seal between the wrench shaft member and the orifice and allows the wrench shaft member to be rotationally and longitudinally displaced. The grommet member also allows the angle at which the long axis of the wrench shaft member intersects the base member to be adjusted, thereby ensuring the sealing cover unit can be used on a wide variety of engine crankcase designs. Spring-clips, or hose-clamps, are used to sealingly connect one end of a flexible tube to the tube fixture member and the opposite to an oil collection container. A large mess screen, or a similar device, is positioned inside the sealing cover unit to prevent the drain plug from falling through the orifice and entering the tubing.

The present invention is used by positioning the sealing cover unit under the engine crankcase so the wrench socket engages the head of the drain plug. The mouth of the sealing cover unit is attached to the ferromagnetic crankcase drain pan by the force of the magnets imbedded in the superior surface of the baffle member. The magnetic force is sufficient to securely hold the sealing cover unit to the crankcase drain pan. The socket wrench member is used to completely unscrew the drain plug. The wrench shaft member is longitudinally displaced away from the crankcase and the drain plug is allowed to drop to the base of the sealing cover unit. The wrench shaft member cannot fall out of the sealing cover unit when the wrench socket is attached to its distal end because the diameter of the wrench socket is greater than the diameter of the second orifice in the base member that the wrench shaft member protrudes through. The socket wrench is disconnected from the wrench shaft member. The spent oil flows by gravity into the sealing cover unit, through the flexible tube, and into the oil collection container. The mechanic can easily determine when the oil flow has stopped if the tube is constructed of light transmissive material. The baffle is pulled away from the crankcase drain hole pan when the oil flow has stopped. The drain plug is removed from the sealing cover unit and screwed back into the crankcase drain hole.

The present invention also includes an oil filter piercing member. The proximal end of the oil filter piercing member can be fitted onto the complimentary, distal end of the wrench shaft member. A cylinder that is tapered to a point represents the distal end of the oil filter piercing member. The sealing cover unit is attached to the ferromagnetic oil filter by the force of the magnets imbedded in the superior surface of the baffle member. A hammer, or similar, tool is used to strike the proximal end of the wrench shaft member so that the shell of the oil filter is pierced. The wrench shaft member is wiggled back and forth as the oil filter piercing member is pulled out of the hole created in the oil filter. The wrench shaft member will not fall out of the orifice in the base of the sealing cover unit because the diameter of the oil filter piercing member is larger than the diameter of the orifice. The residual oil in the oil filter flows into the oil collection container, as described above.

The features and advantages of the present invention will become apparent from the following detailed description of the invention when read with the accompanying drawing.

DESCRIPTION OF PREFERRED EMBODIMENTS

Figure 1:
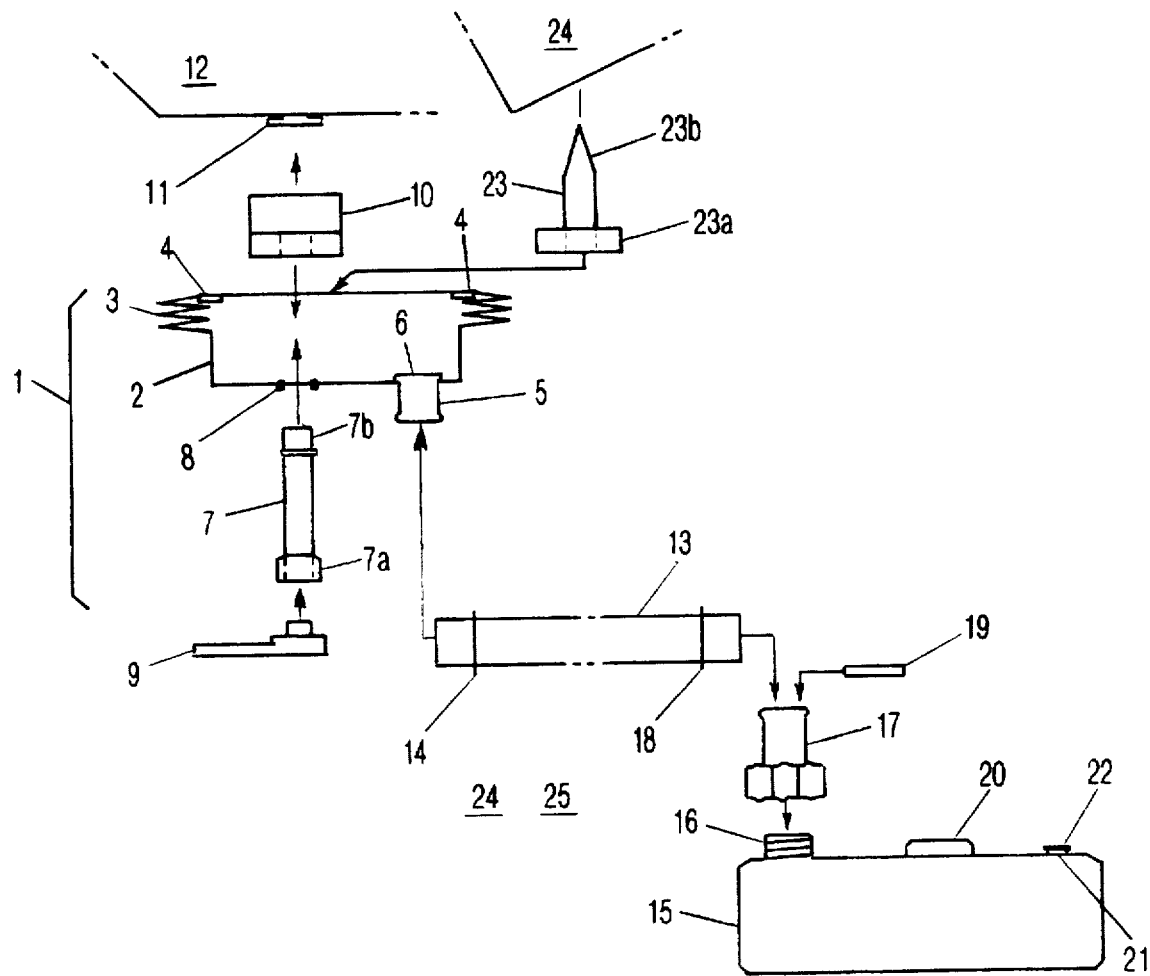
FIG. 1 is the sole figure that presents a cut-away view of a preferred embodiment of the present invention.

Refer now to FIG. 1 which represents a cut-away view of a preferred embodiment of the invention. The sealing cover unit is represented by 1. 1 is constructed of materials that are resistant to chemical and thermal attack by motor oils. 1 is sized and configured so it can be used on a wide variety of engine crankcase designs. 2 comprises a rectangular base representing the bottom of 1, having first and second orifices in its inferior surface, and serving as a leaktight fluid reservoir. 2 is preferably constructed of rigid plastic or rubber. A flexible and expandable rubber or plastic baffle 3 represents the top of 1 and serves as the mouth of 1. 3 enables 1 to be snugly fitted to irregular surfaces (e.g., the bottom of a engine crankcase) to form a leaktight seal. The superior surface of 3 is flat and flexible. Permanent magnets 4 are imbedded around the circumference of the superior surface of 3. The magnetic attraction of 4 is sufficient to securely attach 1 to the bottom of an internal combustion engine's ferromagnetic crankcase 12 and ferromagnetic oil filter 24, and other ferromagnetic reservoirs.

A tube fixture 5 is molded into the base of 2 and communicates with the first orifice in 2. 6 is preferably a large mesh screen, or simple bar-like formations, attached to 2 and prevent the drain plug from falling through the orifice in the inferior surface of 2 that communicates with 5. A wrench shaft member 7 protrudes through the second orifice in the inferior surface of 2. A grommet-type member 8 forms a leaktight seal between 7 and 2 and allows 7 to be rotationally and longitudinally displaced. 8 also allows the angle at which the long axis of 7 intersects 2 to be adjusted. 7a represents the proximal end of 7. 7a has a square, female-type head that provides a means to attach 7 to a typical socket wrench 9 that has a complimentary, square, male-type head. 7b represents the distal end of 7. 7b has a square, male-type head that provides a means to attach 7 to a typical wrench socket 10 that has a complimentary, square, female-type head. 10 is sized to engage the head of the drain plug 11 located on the engine crankcase 12. The diameter of 7a is greater than the diameter of the second orifice in 2 that 7 protrudes through. Thus, 7 can be pulled out of and removed from 2 if desired. However, 7 cannot be pulled out of and removed from 2 when 10 is attached 7b because the diameter of 10 is larger than the diameter of the orifice in 2. This ensures 7 cannot fall out of 2 during use and result in a spill.

13 represents a flexible, light transmissive tube having first and second open ends. The length and diameter of 13 are sized to optimize ease of operation. The first open end of 13 snugly fits over 5. A spring clip 14 is used to secure 13 in place over 5.

15 represents a large, plastic oil collection container that is sized and configured to maximize ease of operation and to ensure its capacity exceeds the maximum volume of oil held by common engine crankcases. A threaded fixture 16 is molded into the superior surface of 15 and serves as the mouth of 15. 17 represents a tube fixture that is threaded onto 16. The second open end of 13 snugly fits over 17. A spring clip 18 is used to secure 13 in place over 17. 19 represents a sealing cap that snugly fits over 17 to prevent spillage when the oil change device is not being used.

A handle 20 is molded into the superior surface of 15. 21 represents a threaded, male-type fixture that is molded into the superior surface of 15 and serves as an air vent. 22 represents a plastic or metal threaded air vent cap that is screwed onto 21 to prevent spillage when the oil change device is not being used.

23 represents a steel, oil filter piercing tool. 23a represents the proximal end of 23. 23a has a square, female-type head that provides a means to attach 23 to the 7b. 23b represents the distal end of 23 and is a cylinder that is tapered to a sharp point, capable of piercing the skin of an oil filter and other thin-skinned fluid reservoirs when a striking blow is delivered to 7a. 7 cannot be pulled out of and removed from 2 when 23 is attached 7b because the diameter of 23 is larger than the diameter of the orifice in 2. This ensures 7 cannot fall out of 2 during use and result in a spill.

In another embodiment of the present invention 5 is attached to an end of 2, rather than to the inferior surface of 2. An alternate means may be used to connect 13 to 5 and to 17. Also, an alternate means (e.g., making the diameter of 7b larger than the diameter of the orifice in 2 that 7 passes through) may be used to prevent the 7 from falling out of 2. In addition, a flexible spout may be included that can be attached to 16 to be used to decant spent oil in the oil collection container. Finally, a hand-operated vacuum pump may be included to increase the speed at which the oil is collected.

The objectives of the present invention are met because the present invention can be used to collect the spent oil from an internal combustion engine's crankcase and oil filter without creating a mess. The present invention minimizes the volume of spent oil that is typically spilled as it is collected because the spent oil is contained at all times. Maximizing the volume of spent oil that is collected decreases the environmental and health hazards created by the spilled oil and increases the volume of spent oil that is available for recycling. The present invention ensures that the mechanic does not have to be in direct, hand contact with the drain plug as it is removed from the crankcase. The present invention is noncomplex, lightweight, easy to operate, and of inexpensive construction.

The foregoing description of the preferred embodiment of the invention has been presented for the purposes of illustration and description. It is not intended to be exhaustive or limit the invention to the precise form disclosed. Many modifications and variations are possible inlight of the above teaching. It is intended that the scope of the invention be limited not by this detailed description, but rather by the claims appended hereto.

What is claimed is:

1. A device for collecting fluid from a reservoir having a drain plug, the device comprising:
   (a) a sealing cover unit, having a top and a bottom, and comprising
       a baffle means, mounted at said top of said sealing cover unit, for providing a mouth into said sealing cover unit, said baffle means having a superior surface and an inferior surface,
       magnet means located at the superior surface of said baffle means for magnetically attaching said sealing cover unit to the reservoir,
       a base, mounted at said bottom of said sealing cover unit for providing a fluid reservoir, said base having first and second orifices,
       a tube fixture, attached to said base, for communicating with said first orifice,
       means for preventing the drain plug from passing through said first orifice,
       a wrench shaft protruding through said second orifice in said base, said wrench shaft having proximal and distal ends and a long axis, and said proximal end having a female-type head means for connecting said wrench shaft to a socket wrench having a complementary, male-type head,
       means for connecting said distal end of said wrench shaft to a wrench socket having a diameter larger than said second orifice of said base and sized to engage the drain plug located on the reservoir, whereby said wrench shaft cannot fall out of said sealing cover unit when the wrench socket is connected to said distal end, and
       a grommet-type means for sealing said wrench shaft and said base member, whereby said wrench shaft is capable of rotational and longitudinal displacement and an angle of intersection between said long axis of said wrench shaft and said base is capable of adjustment;
   (b) a fluid collection container having a mouth;
   (c) a flexible tube means having first and second open ends;
   (d) means for connecting said first end of said tube to said tube fixture; and
   (e) means for connecting said second end of said tube to said mouth of said fluid collection container.

2. The device of claim 1, wherein the reservoir is a crankcase of an internal combustion engine.

3. The device of claim 1, wherein the reservoir is ferromagnetic.

4. The device of claim 1, wherein the fluid to be collected is oil.

5. The device of claim 1, wherein the fluid to be collected is spent motor oil.

6. The device of claim 1, wherein said baffle means is flexible.

7. The device of claim 1, wherein said baffle means is expandable.

8. The device of claim 1, wherein said magnet means is attached to said superior surface of said baffle means.

9. The device of claim 1, wherein said magnet means is embedded in said superior surface of said baffle means.

10. The device of claim 1, wherein said magnet means is permanent.

11. The device of claim 1, wherein said means for preventing the drain plug from passing through said first orifice comprises a screen positioned inside said sealing cover unit.

12. The device of claim 1, wherein the reservoir has a thin skin, and further comprising:
    a piercing tool having a proximal and a distal end, said distal end comprising a means for piercing the skin of the reservoir when a striking blow is delivered to said proximal end of said piercing tool, and
    means to connect said proximal end of said piercing tool to said distal end of said wrench shaft.

13. The device of claim 12, wherein the reservoir is an oil filter.

14. The device of claim 12, wherein the reservoir is a ferromagnetic oil filter.

15. The device of claim 12, wherein said distal end of said piercing tool is sharply pointed.

16. The device of claim 12, wherein said piercing tool comprises a cylinder that is tapered to a point at said distal end.

17. A method of collecting fluid from a reservoir having a drain plug, the steps comprising:

(1) positioning a collecting device under the reservoir, said collecting device comprising:
 (a) sealing cover unit having a top and a bottom, and comprising
  a baffle means, mounted at said top of said sealing cover unit, for providing a mouth into said sealing cover unit, said baffle means having a superior surface and an inferior surface,
  magnet means located at the superior surface of said baffle means for magnetically attaching said sealing cover unit to the reservoir,
  a base, mounted at said bottom of said sealing cover unit for providing a fluid reservoir, said base having first and second orifices,
  a tube fixture, attached to said base, for communicating with said first orifice,
  means for preventing the drain plug from passing through said first orifice,
  a wrench shaft protruding through said second orifice in said base, said wrench shaft having proximal and distal ends and a long axis, and said proximal end having a female-type head means for connecting said wrench shaft to a socket wrench having a complementary, male-type head,
  means for connecting said distal end of said wrench shaft to a wrench socket having a diameter larger than said second orifice of said base and sized to engage the drain plug located on the reservoir, whereby said wrench shaft cannot fall out of said sealing cover unit when the wrench socket is connected to said distal end, and
  a grommet-type means for sealing said wrench shaft and said base member, whereby said wrench shaft is capable of rotational and longitudinal displacement and an angle of intersection between said long axis of said wrench shaft and said base is capable of adjustment;
 (b) a fluid collection container having a mouth,
 (c) a flexible tube means having first and second open ends;
 (d) means for connecting said first end of said tube to said tube fixture; and
 (e) means for connecting said second end of said tube to said mouth of said fluid collection container;
(2) attaching said mouth of said baffle means to the reservoir by said magnet means;
(3) unscrewing the drain plug with said socket wrench connected to said proximal end of said wrench shaft;
(4) longitudinally displacing said wrench shaft away from said reservoir;
(5) allowing said drain plug to drop to said base of said sealing cover unit;
(6) disconnecting the socket wrench from said wrench shaft;
(7) allowing the fluid to flow by gravity into said sealing cover unit, through said flexible tube and into said container;
(8) determining when said oil flow has stopped;
(9) pulling away said baffle means from said reservoir;
(10) removing the drain plug from said sealing cover unit; and
(11) reattaching the drain plug to the reservoir.

18. The method of claim 17, wherein steps (1) through (11) are performed in the absence of direct contact between the collector and the drain plug.

19. The method of claim 17, wherein the reservoir has a thin skin and said collecting device further comprises a piercing tool having a proximal and a distal end, said distal end comprising a means for piercing the skin of the reservoir when a striking blow is delivered to said proximal end of said piercing tool, and means to connect said piercing tool to said distal end of said wrench shaft, further comprising the steps of:

fitting said piercing tool onto said distal end of said wrench shaft;

striking said proximal end of said wrench shaft with said piercing tool, thereby piercing the skin of the reservoir; and simultaneously wiggling said wrench shaft back and forth and pulling said piercing tool out of the hole created in the reservoir.

* * * * *